United States Patent [19]

Shibaoka

[11] Patent Number: 5,215,388
[45] Date of Patent: Jun. 1, 1993

[54] CONTROL OF SPELL CHECKING DEVICE

[75] Inventor: Hideo Shibaoka, Yokohama, Japan

[73] Assignee: Canon Kabushiki Kaisha, Tokyo, Japan

[21] Appl. No.: 965,567

[22] Filed: Oct. 23, 1992

Related U.S. Application Data

[63] Continuation of Ser. No. 687,078, Apr. 18, 1991, abandoned, which is a continuation of Ser. No. 360,450, Jun. 2, 1989, abandoned.

[30] Foreign Application Priority Data

Jun. 10, 1988 [JP] Japan ................. 63-141619

[51] Int. Cl.⁵ .............................................. B41J 5/30
[52] U.S. Cl. ................................... 400/63; 400/74
[58] Field of Search ............... 400/63, 74; 364/419, 364/943.41

[56] References Cited

U.S. PATENT DOCUMENTS 4,775,251 10/1988 Suzuki ................................. 400/63

FOREIGN PATENT DOCUMENTS 164925 12/1980 Japan ................................. 400/63
90258 5/1986 Japan ................................. 400/63

Primary Examiner—David A. Wiecking
Assistant Examiner—Steven S. Kelley
Attorney, Agent, or Firm—Fitzpatrick, Cella, Harper & Scinto

[57] ABSTRACT

A document processing apparatus such as an electronic typewriter includes: a document memory to store character data and an edit command which are input; a dictionary to store the spellings of correct words; and a checking circuit to check whether the spelling of the word which is expressed by the input character data train is correct by referring to the dictionary. When the spelling of the word is determined to be incorrect as the result of the check by the checking circuit, the process based on the edit command is not performed. Since an opportunity to correct the incorrectly word is given to the operator before the function of the input key is executed, the operator can easily correct it and a misprint due to the erroneous operation of the operator can be prevented.

16 Claims, 3 Drawing Sheets

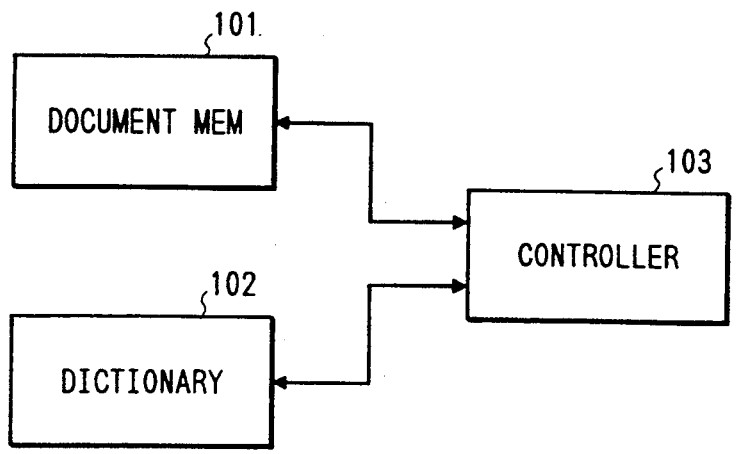
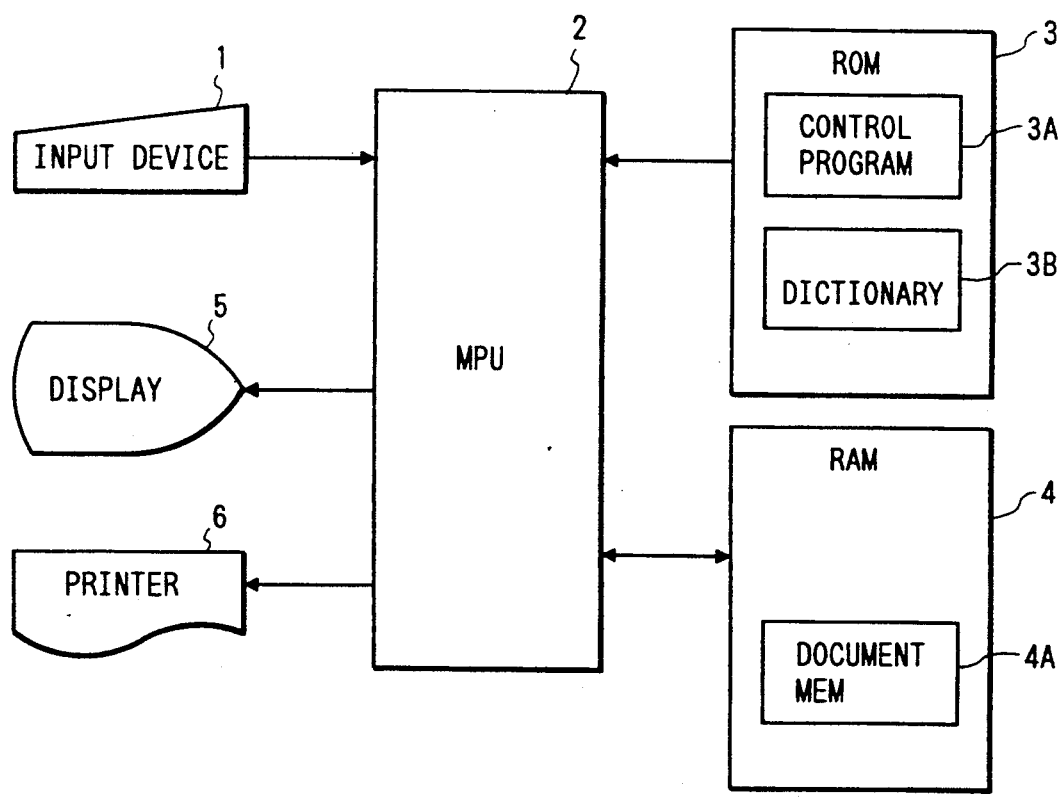

FIG. 3

I play tenis.

I play tenis.↵

I play tennis.↵

CONTROL OF SPELL CHECKING DEVICE

This application is a continuation of application Ser. No. 07/687,078 filed Apr. 18, 1991, now abandoned, which is a continuation of application Ser. No. 07/360,450 filed Jun. 2, 1989, now abandoned.

BACKGROUND OF THE INVENTION

1. Field of the Invention

The present invention relates to a document processing apparatus in which input character information is stored and its content is displayed and printed and, more particularly, to a document processing apparatus having the function to prevent the printing of a word having an incorrect spelling by using this function to check the misspelling of a word.

2. Related Background Art

Hitherto, in a document processing apparatus such as an electronic typewriter or the like, in the case of checking the misspelling of a word during the document input operation, the function to discriminate whether the spelling of the word is correct or incorrect is started when a character or key which is not included in the word is input. For instance, the word spelling check is executed in the case where a function key such as tabulator executing key or line feed key or a space key is input.

However, since there is a case where the printing of the input data is started simultaneously with the execution of the word spelling check by the above function key, there occurs a situation such that a word having an incorrect spelling is printed.

Even in the case where the operator is warned that the spelling of the input word is wrong by an alarm or the like, since the word has already been printed, the operator must erase the erroneously input portion once by moving a carrier and, thereafter, must input the correct characters. If an unerasable print ribbon was used, the word cannot be erased. Even if the word can be erased, an erasing ribbon is consumed. Therefore, the operation is complicated and the document inputting efficiency is low.

SUMMARY OF THE INVENTION

It is an object of the present invention to provide a document processing apparatus in which the word spelling check is started and if the spelling of the word is wrong, an opportunity to correct the word is given to an operator before executing the function of the input key which started the word spelling check, thereby enabling the erroneous printing by the erroneous operation of the operator to be eliminated.

Another object of the invention is to provide a document processing apparatus in which a check is made to determined whether the spelling of a word is correct in response to the input of an edit command, and if the spelling is incorrect, the edit command is not executed.

Still another object of the invention is to provide a document processing apparatus in which a check is made to determine if the spelling of a word is correct in response to the input of an edit command, and if the spelling is incorrect, the edit command is not executed, and if the execution of another command is instructed, the editing corresponding to this command is executed.

BRIEF DESCRIPTION OF THE DRAWINGS

FIG. 1 is a block diagram of a document processing apparatus according to one embodiment of the present invention;

FIG. 2 is a block diagram showing the construction of an embodiment of the invention.

FIG. 3 is a diagrammatical view for explaining a document display format which is displayed on a display shown in FIG. 2.

DETAILED DESCRIPTION OF THE PREFERRED EMBODIMENT

Figure 4:
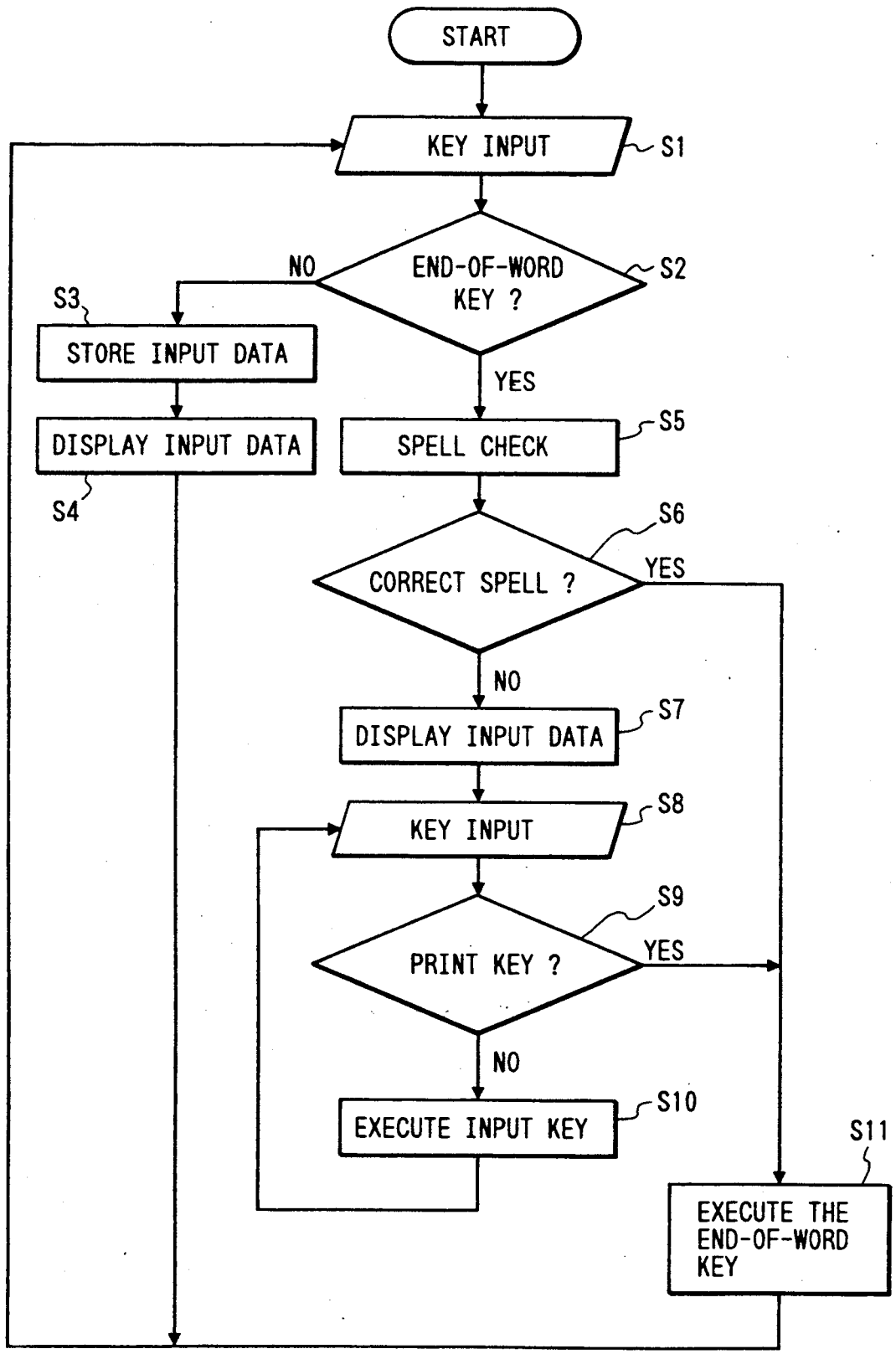
FIG. 4 is a flowchart for explaining the control operation for the document inputting process according to the invention.

The present invention will be described in detail hereinbelow with reference to the drawings.

As shown in FIG. 1, a document processing apparatus according to the invention comprises: document memory 101 to store character code information corresponding to an input character; a dictionary 102 to previously store the spellings of words each consisting of a set of character code information; and a controller 103 for checking whether the spelling of the word constructed by input characters is correct or incorrect by referring to the dictionary 102 and for controlling the document processing operation on the basis of the result of the word spelling check.

FIG. 2 shows a construction of the document processing apparatus of the embodiment of the invention. Reference numeral 1 denotes an input device having a form of, for instance, a keyboard. The input device 1 outputs key code data corresponding to a depressed character key to an MPU (microprocessor) 2. Reference numeral 3 denotes an ROM (read only memory) comprising a control program 3A to control the whole apparatus by the MPU 2, and a dictionary 3B to discriminate whether the word spelling is correct or incorrect, and the like. Reference numeral 4 denotes an RAM (random access memory) which functions as a work memory of the MPU 2. The RAM 4 has a document memory 4A to temporarily store a character code train or the like converted from the key code which had been input from the input device 1.

Reference numeral 5 denotes a display having a form of, for instance, an LCD (liquid crystal display). The display 5 displays the character code train which is read out of the document memory 4A by the MPU 2 on the basis of control information of the control program 3A which is read out of the ROM 3 by the MPU 2.

Reference numeral 6 denotes a printer for printing the character code train which is read out of the document memory 4A by the MPU 2 on the basis of control information of the control program 3A which is read out of the ROM 3 by the MPU 2.

Figure 3:
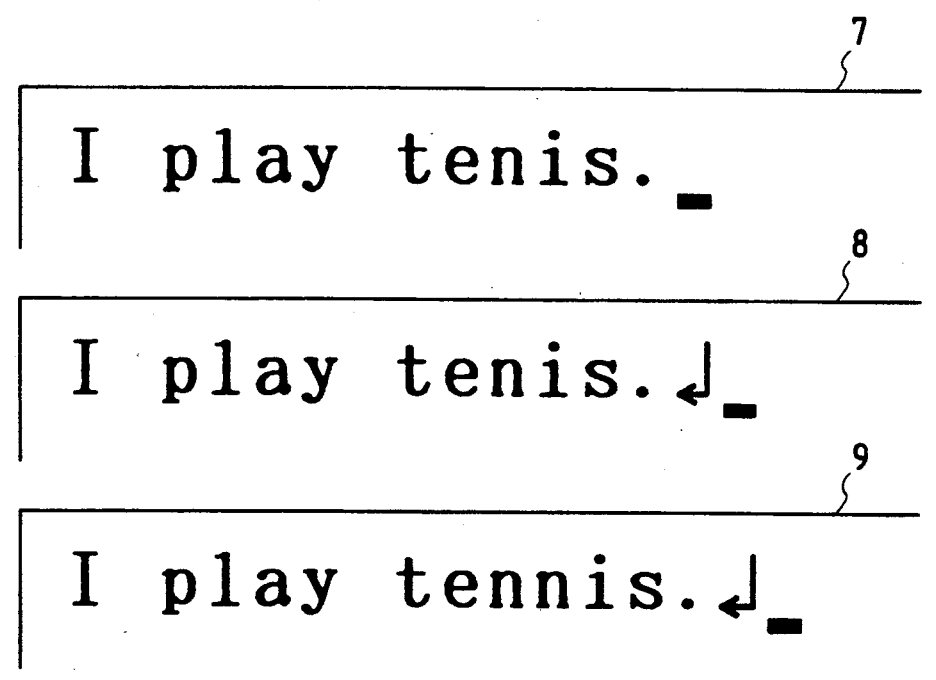

The document inputting process in association with the word spelling check according to the invention will now be described with reference to the embodiment shown in FIG. 3 and a flowchart of FIG. 4.

FIG. 3 is a diagrammatical view for explaining a document display format which is displayed by the display 5 shown in FIG. 2. Reference numeral 7 indicates the state of the apparatus while a document is being input. Although the document has been stored in the document memory 4A, it is not printed yet. The input position of the character is indicated by a cursor displayed by a symbol "_". Reference numeral 8 shows the state of the apparatus in which a line feed key was input in the state of 7 and shows that the line feed key was input by a symbol " ". In this state, the printing due to the input of the line feed key is not executed yet. Reference numeral 9 shows the state of the apparatus in which a word "tenis" was corrected to "tennis" from the state of 8.

FIG. 4 is a flowchart for explaining the document inputting process in association with the word spelling check according to the invention. S1 to S11 denote processing steps. In a document processing apparatus such as an electronic typewriter or the like in the present embodiment, an input system for printing every line will be described as an example. However, the embodiment can be also applied to the case of using an input system for printing every word or an input system for inputting or printing a document all at once.

First, in step S1, when a character key in the input device 1 is depressed, the code corresponding to the depressed key is input to the MPU 2. In the next step S2, the MPU 2 discriminates whether the input key is the end of a word or not on the basis of the key code data. A key other than an end-of-word key is a character key or the like which is a component element of the word. The end-of-word key is a function key such as tabulator executing key, line feed key, space key, or the like other than the character key.

In step S2, if the MPU 2 determines that the input key is not the end-of-word key, step S3 follows. In step S3, the input key code data is converted into the character code data and stored into the document memory 4A. At the same time, in step S4, in order to inform the operator of the fact that the key has correctly been input, the MPU 2 sends the display data corresponding to the character code data to the display 5 and displays it. Then, the apparatus waits until a next key is input.

In step S2, if it is decided that the input key is the end-of-word key, step S5 follows and the MPU 2 separately reads out the word from the document memory 4A and checks its spelling.

In step S6, the MPU 2 determines that the input character train from the character train which was input after the previous end-of-word key to the input character train before the present end-of-word key is one word and searches whether the word exists in the dictionary 3B in the ROM 3 or not, thereby discriminating whether the spelling of the word is correct or not.

In the example shown by reference numeral 8 in FIG. 3, the end-of-word key input is displayed at two positions corresponding to the space " " and the line feed key " ". When those keys are input, the MPU 2 separately reads out words "I", "play", and "tenis". It is now assumed that as the result of the word spelling check in step S6, the words "I" and "play" were determined to be the correct spellings and the word "tenis" was decided to be the wrong spelling. In the case of the words "I" and "play" whose spellings were determined to be correct, in step S11, the end-of-word keys are executed in a manner similar to the ordinary case. Then, the processing routine is returned to step S1 and the apparatus waits until a key is input. In the example shown by reference numeral 8 in FIG. 3, the space key " " is the end-of-word key and the character code data is stored into the document memory 4A and displayed on the display 5.

On the other hand, in the case of the word "tenis" whose spelling was decided to be wrong in step S6, step S7 follows and a warning is generated to the operator by an alarm or the like and the end-of-word key is displayed. The MPU 2 preserves the input key code data into the work area in the RAM 4.

In the example shown by reference numeral 8 in FIG. 3, the line feed key " " is the end-of-word key and a state in which it is being displayed is shown. The operator decides whether the word spelling should be corrected or whether the function of the key should be executed without correcting from such a state. In step S8, the key is input.

The processing routine advances to step S9 and when the operator checks the display content and wants to continue the inputting operation in the present input state, step S11 follows. In step S11, the function key to promote the execution of the end-of-word key is input and the subsequent operations are continued. It is also possible to construct this function key in a manner such that by again depressing the end-of-word key, the function is executed.

On the other hand, in the case of correcting the incorrectly spelled word, a key other than the function key to promote the execution of the end-of-word key is input in step S8. If a key other than a print command key has been input in step S9, step S10 follows and this key is executed and the correcting work is performed.

As a correcting method, it is possible to use a method whereby a cursor is moved to the portion to be corrected and the wrong character is deleted and the correct spelling is input again, a method whereby a possible word having the spelling similar to the word having the wrong spelling is obtained from the dictionary 4B on the basis of the wrong word and the wrong word is automatically substituted by the possible correct word, or the like. After completion of the word correcting work by the operator, the function key to promote the execution of the end-of-word key is input in step S8. The execution of the end-of-word key is started in step S11. In the example shown by reference numeral 8 in FIG. 3, the word "tenis" is corrected to "tennis" and a state shown by reference numeral 9 in FIG. 3 is obtained. If the end-of-word key, in this embodiment, the function key to promote the execution of the line feed key, for instance, a "continue key" or the like has been input, the line feed key is executed. In the case where the inputting operation is being executed by the inputting method of printing every line, the relevant line is printed and, thereafter, the line feed is performed. In the case where the inputting operation is being executed by the inputting method by only display, the cursor is moved to the next line and the inputting operation of the next and subsequent lines is continued. It is also possible to construct the in a manner such that by again depressing the foregoing end-of-word key at the time when the correction was executed, the function similar to that in the case where the above continue key was depressed is executed.

As mentioned above, by giving the opportunity for correction once in the case where the operator made a mistake to input a word of the wrong spelling, the correcting word which must be executed because the next function has been executed although the operator understands that the spelling of the word is wrong can be omitted.

By the above method, a word having a wrong spelling can be corrected before the function key is executed. However, if the execution of the function key serving as the end-of-word key does not activate the printing, the working methods and working amounts of the word correction before and after the execution of the function key are almost the same. In any of the cases, it is sufficient to merely correct the unprinted data on the display.

Therefore, when the function key serving as the end-of-word key does not activate the printing, it is more practical to stop the execution of the function key only when the function key activated the printing without newly stopping the execution of the function key.

On the other hand, in consideration of only the case where the printing was activated on the contrary, it is also possible to control the apparatus in a manner such that the spellings of all of the words in the unprinted data are checked and in the case where the word having the wrong spelling exists, the printing is stopped and an opportunity to correct the wrong word spelling is given to the operator.

As described above, according to the invention, if the word having the wrong spelling is input, an opportunity for correction is given to the operator at the time point when it is determined that the spelling of the input word is wrong. Therefore, there is an advantage such that the word having the wrong spelling can be easily corrected on the display screen.

I claim:

1. A document processing apparatus comprising:
   means for storing character data and an edit command which are input into said apparatus;
   a dictionary for storing correctly spelled words; and
   checking means for checking whether the spelling of a word corresponding to the input character data is correct by referring to said dictionary; and
   means for executing a process corresponding to the edit command and then controlling said checking means to execute a spelling check when the edit command is not followed by the input of a print command, and for controlling said checking means to execute a spelling check prior to executing a process corresponding to the edit command when the edit command is followed by the input of a print command.

2. An apparatus according to claim 1, wherein said storing means comprises a document memory.

3. An apparatus according to claim 1, wherein the edit command includes a command for making a new paragraph.

4. An apparatus according to claim 1, further comprising means for inputting character data in response to a cursor position on a display.

5. An apparatus according to claim 1, further comprising means for determining whether input information indicates an end of a word.

6. A document processing apparatus comprising:
   input means for inputting character data, and command data to instruct the execution of document editing and to designate the end of the character data;
   discriminating means for discriminating whether a word corresponding to the input character data and whose end is designated by the command data is correctly spelled in response to the inputting of the command data by said input means; and
   control means for inhibiting the execution of an editing process based on the command data if it is determined that the word is incorrectly spelled on the basis of the discriminating by said discriminating means and for allowing the editing process corresponding to the command data to be executed if the command data is inputted again before further input of character data even when it is determined that the word is incorrectly spelled.

7. An apparatus according to claim 6, further comprising means for storing the input character data.

8. An apparatus according to claim 6, wherein the command data includes a command for making a new paragraph.

9. A document processing method comprising the steps of:
   storing character data and an edit command which are input into a document processing apparatus;
   checking whether the spelling of a word corresponding to the stored character data is correct by referring to stored correctly spelled words in a dictionary of the document processing apparatus; and
   executing a process corresponding to the edit command and then controlling said checking step to execute a spelling check operation when the edit command is not followed by the input of a print command into the document processing apparatus, controlling said checking step to execute a spelling check operation prior to executing a process corresponding to the edit command when the edit command is followed by the input of a print command into the document processing apparatus.

10. A method according to claim 9, wherein said storing step stores character data and the edit command in a document memory.

11. A method according to claim 9, wherein said storing step stores an edit command for making a new paragraph.

12. A method according to claim 9, further comprising the step of inputting character data into the document processing apparatus in response to a cursor position on a display.

13. A method according to claim 9, further comprising the step of determining whether data input into the document processing apparatus indicates the end of a word.

14. A document processing method comprising the step of:
   inputting character data, and command data into a document processing apparatus to instruct the execution of document editing and to designate the end of the character data;
   discriminating whether a word corresponding to the input character data and whose end is designated by the command data is correctly spelled in response to the inputting of the command data in said inputting step; and
   inhibiting the execution of an editing process based on the command data if it is determined that the word is incorrectly spelled on the basis of the discriminating in said discriminating step and for allowing the editing process corresponding to the command data to be executed if the command data is inputted again before further input of character data even when it is determined that the word is incorrectly spelled.

15. A method according to claim 14, further comprising the step of storing the inputted character data.

16. A method according to claim 14, wherein said inputting step comprises the step of inputting command data for making a new paragraph into the document processing apparatus.

* * * * *

UNITED STATES PATENT AND TRADEMARK OFFICE
CERTIFICATE OF CORRECTION

PATENT NO. : 5,215,388
DATED : June 1, 1993
INVENTOR(S) : HIDEO SHIBAOKA

It is certified that error appears in the above-indentified patent and that said Letters Patent is hereby corrected as shown below:

On the Title Page, Item [57]
    Line 11, "incorrectly" should read --incorrectly spelled--.

<u>COLUMN 1</u>
    Line 58, "determined" should read --determine--.

<u>COLUMN 3</u>
    Line 3, "symbol" "." should read --symbol "↵".--.
    Line 50, "space" " " should read --space "⌴"--.
    Line 63, "" "" should read --"⌴"--.

<u>COLUMN 4</u>
    Line 52, "the" should read --the invention--.

<u>COLUMN 5</u>
    Line 60, "the" should read --said--.

<u>COLUMN 6</u>
    Line 21, after "apparatus" insert --and--.
    Line 42, "step" should read --steps--.

Signed and Sealed this

Tenth Day of May, 1994

BRUCE LEHMAN

*Attest:*

*Attesting Officer*     *Commissioner of Patents and Trademarks*